April 23, 1968      G. W. SMITH      3,379,395
V/STOL AIRCRAFT
Filed Aug. 9, 1965      3 Sheets-Sheet 1
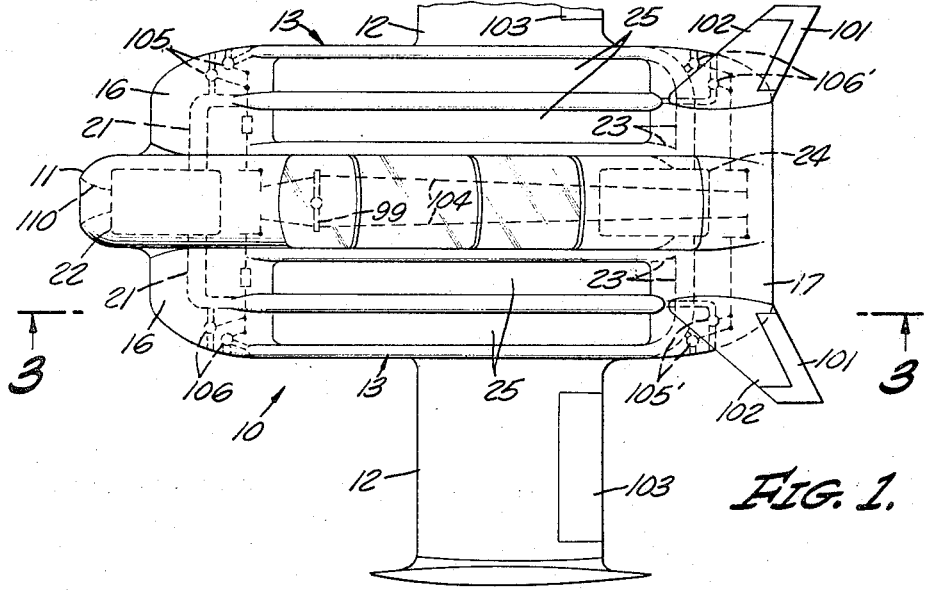
FIG. 1.
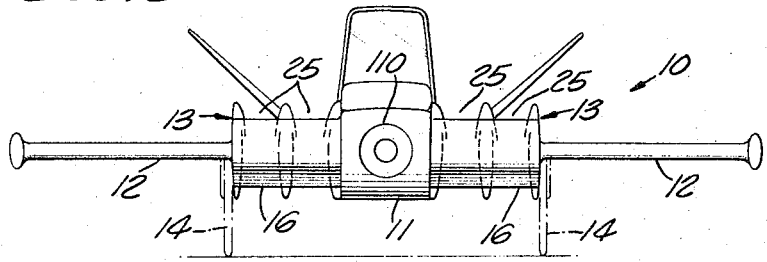
FIG. 2.
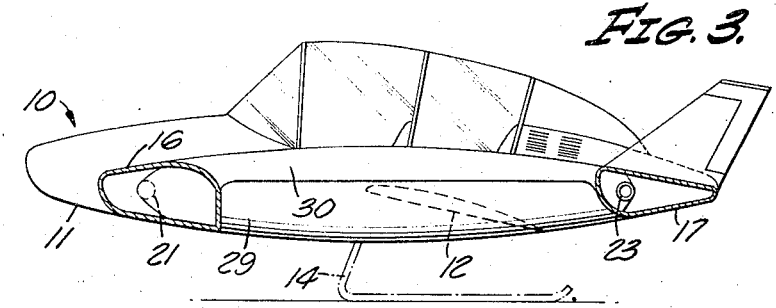
FIG. 3.
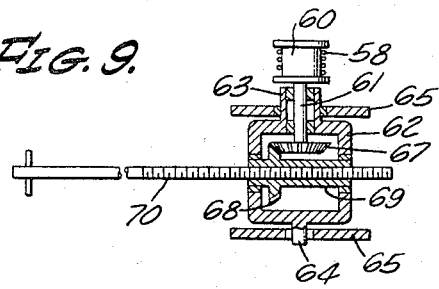
FIG. 9.
GENE W. SMITH
INVENTOR.
BY
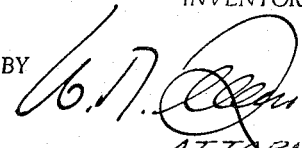
ATTORNEY

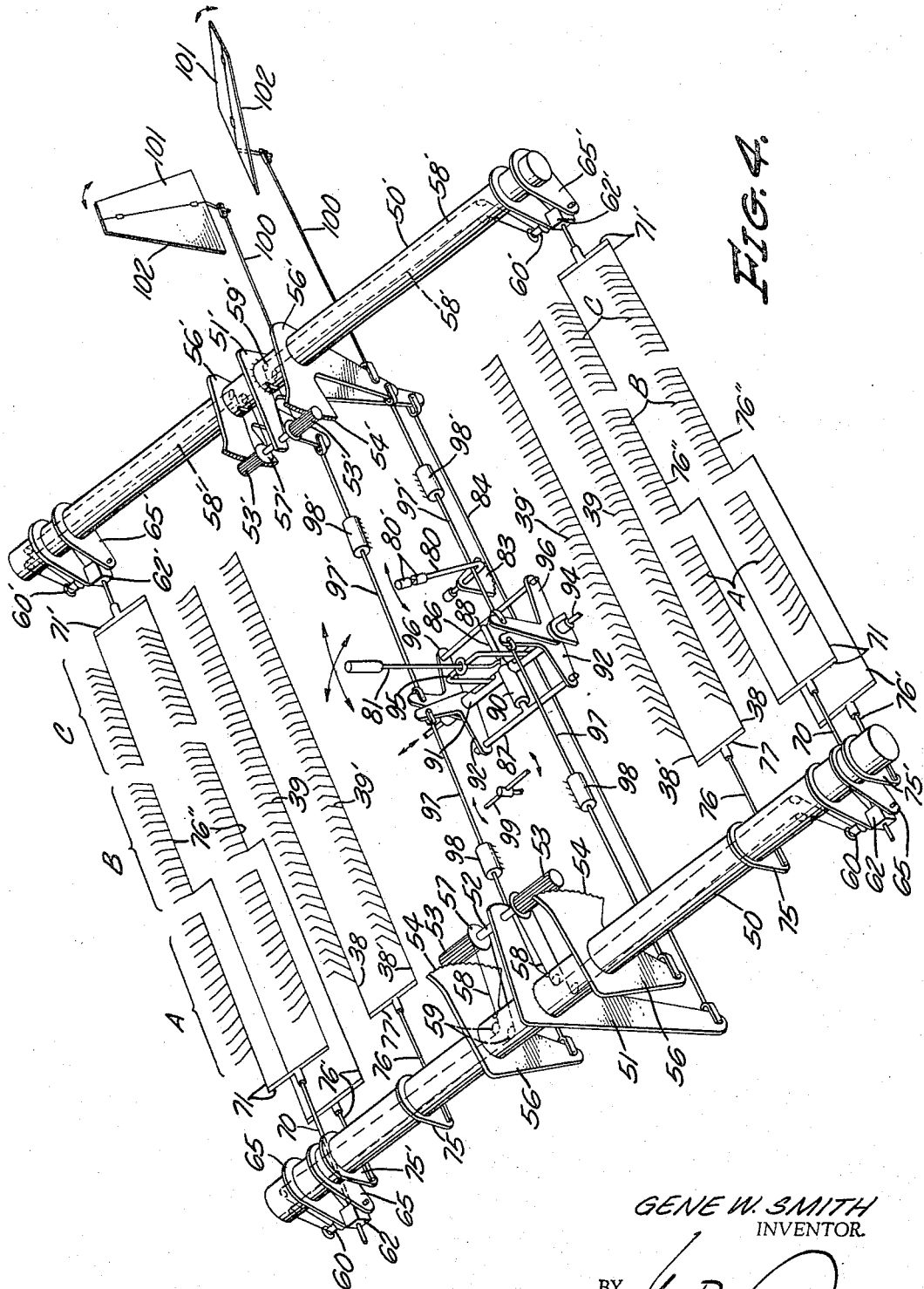

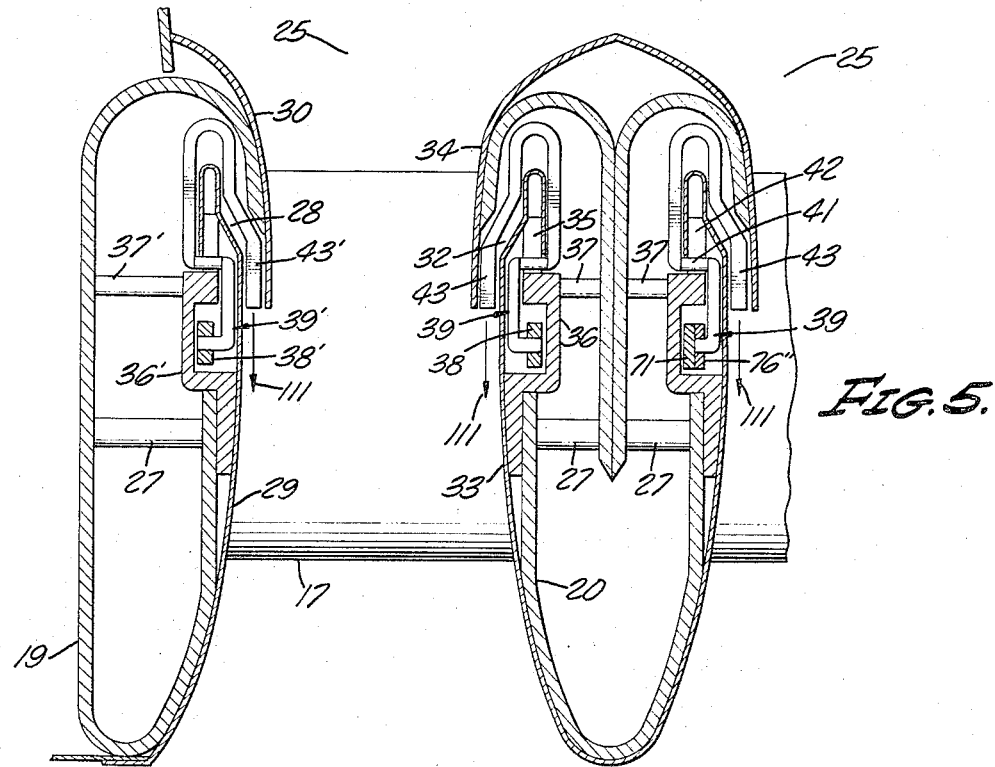
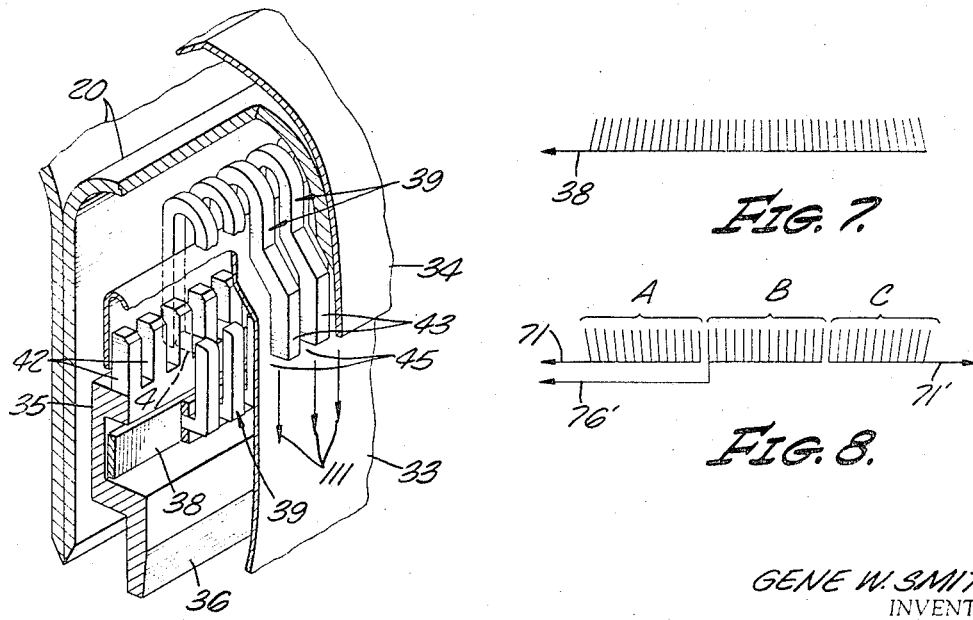

United States Patent Office 3,379,395
Patented Apr. 23, 1968

3,379,395
V/STOL AIRCRAFT
Gene W. Smith, 5008 La Canada Blvd.,
La Canada, Calif. 91011
Filed Aug. 9, 1965, Ser. No. 478,197
28 Claims. (Cl. 244—12)

This invention relates to aircraft and more particularly to an improved vertical and short take-off and landing aircraft design utilizing hot pressurized gas in a unique manner for take-off and landing substantially vertically and thereafter utilizable to support the craft in a hovering mode or for normal forward propulsion and maneuvering of the craft in generally horizontal flight assisted by the supporting action of airfoil structures. The hot gas is discharged downwardly along the sides of the throat portions of venturi slots opening generally vertically and extending along either side of the fuselage and are effective to entrain a mass flow of air downwardly to create an upper low pressure zone and an underlying high pressure zone in addition to powerful lifting action. These several mutually cooperating effects are utilized to lift, propel and maneuver the aircraft, the direction and magnitude of the resultant thrust being controllable in a highly effective manner by selective and differential adjustment of the direction of discharge from the gas jets relative to the nonadjustable venturi structures. Yaw control is provided by gas jet discharging from the diagonally located ends of the aircraft. Lift during forward flight is augmented by the airfoil structures extending laterally from the main body of the aircraft at both ends thereof as well as from the midlength of the aircraft.

One of the serious disadvantages of more conventional V/STOL aircraft presently proposed is the very considerable amount of both air and ground space required during take-off and landing operations because of the reliance placed on airfoil structures to support the craft in the air and the need for relative wind over the airfoils to sustain the craft in flight. In consequence, long runways are required to reach flying speed and additional air space is required to gain altitude.

To avoid these and other disadvantages, various proposals have been made having as their object utilization of the craft power plant to raise the plane vertically and including means for thereafter adjusting the components to utilize the power plant for forward propulsion purposes. Up to this time, prior proposals utilizing nonrotating type airfoils have not met with any significant success.

With the foregoing considerations, characteristics and limitations or prior proposals in mind, it is a primary purpose of the present invention to provide a unique, heavier-than-air aircraft of an unusually versatile nature capable of highly reliable take-off and landing operations from either a spot or runway-type landing area and featuring unique, simple, efficient and easily operated means by which the craft can be quickly and safely transitioned between vertical and normal horizontal flight regimes. According to one preferred embodiment, the aircraft comprises an elongated fuselage equipped with one or more gas-generating devices and a passenger compartment. Projecting laterally from either side of the fuselage is structure incorporating one or more pairs of vertically disposed, venturi-like slots provided with rows of nozzles along either side of their throats and through which pressurized hot gas is delivered to motivate the craft during take-off, flight and landing operations. Supplementing these slots in the support of the aircraft in flight, there is preferably provided airfoil structures projecting laterally beyond the outer sides of the slot structures.

All gas generated by the gas-generating device is distributed in major part for discharge downwardly from the throat areas of these slots in a manner to entrain a mass flow of the ambient air and to utilize this mass flow to supplement the reaction forces of the gas streams themselves in motivating the craft. Both the hot gas and the mass air flow are channelized in a manner to support and propel the craft as desired along any selected path of travel. Other portions of the pressurized hot gas can be utilized as need arises for roll, pitch and yaw movements.

Each of the discharge ports provided along the throats of the air slot is equipped with simple, easily manipulated flow directing members for regulating the direction of gas discharge and thereby the direction of craft movement under the control of a pair of pilot-manipulated control members or sticks operated similarly to the controls of conventional helicopters. Yaw movements are further assisted by a rudder control having appropriate operating connections with pivotally supported rudder members carried by the tail stabilizer structure.

It is therefore a primary object of the present invention to provide a unique, heavier-than-air aircraft capable of taking off and landing vertically as well as from a short runway utilizing hot pressurized gas to supply the motivating force.

Another object of the invention is to provide a short take-off and vertical landing aircraft utilizing a plurality of elongated generally vertically disposed venturi-like slots extending along the sides of its fuselage and through which hot pressurized gas is discharged in a manner to support the aircraft in a hovering or a propelled condition at the pilot's option.

Another object of the invention is the provision of a compact, lightweight, high efficiency aircraft having means for distributing hot pressurized gases through a plurality of air flow ports of adjustable size and flow direction extending lengthwise of the fuselage and manipulatable to lift and lower the aircraft generally vertically or to propel it generally horizontally utilizing hot pressurized gas as the motivating force.

Another object of the invention is the provision of an aircraft designed to be supported in flight in part by air flow over airfoil structures projecting laterally from the fuselage and in part by mass air flow downwardly past the fuselage and generally transversely of the air flowing over the generally conventional airfoil structures and supplementing the latter flow in supporting and propelling the aircraft.

Another object of the invention is the provision of a V/STOL aircraft having a unique control system for controlling the transitioning between different flight regimes through manipulation of a multiplicity of vane-like members directing the flow of the hot propulsion gases.

Another object of the invention is the provision of an aircraft motivating structure utilizing venturi-like slots having throats of rectangular cross-section and including means arranged along their longer sides for jetting adjustable streams of hot pressurized gas thereby to entrain a mass flow of ambient air through the venturi slot proper to augment the propulsion forces and to control the flight path.

Another object of the invention is the provision of an aircraft utilizing hot pressurized gas as the motivating force and utilizing multiple sets of selectively operable adjustable vanes for varying the quantity and direction of the gas flow thereby to control the direction and nature of the flight path.

Another object of the invention is the provision of an aircraft propelled by hot pressurized gas distributed equitably to both sides of the aircraft from centralized gas-generating means and preferably employing a plurality of independent gas-generating means each arranged to supply gas equitably to both sides of the aircraft with the result that failure of one gas source for any reason does not seriously interfere with the safety and operating ability of the craft.

Another object of the invention is the provision of a V/STOL aircraft which is easily, efficiently and safely transitioned between vertical, hovering and horizontal flight regimes simply by adjusting the direction of flow of the motivating gas stream within the throat zones of venturi-shaped slots.

Another object of the invention is the provision of a unique control system manipulatable by the pilot and including a collective control operable to adjust all of a multiplicity of gas flow jets simultaneously and a differential control functioning to adjust groups of the gas flow jets selectively and differentially to regulate pitch, roll and yaw movements.

These and other more specific objects will appear upon reading the following specification and claims and upon considering in connection therewith the attached drawings to which they relate.

Referring now to the drawings in which a preferred embodiment of the invention is illustrated:

FIGURE 1 is a fragmentary top plan view of one preferred embodiment of an aircraft embodying the principles of this invention;

FIGURE 2 is a front elevational view of FIGURE 1;

FIGURE 3 is a cross-sectional view taken along line 3—3 on FIGURE 1;

FIGURE 4 is a perspective schematic view of essential components of the control system;

FIGURE 5 is a fragmentary cross-sectional view on an enlarged scale taken through an inboard air slot;

FIGURE 6 is a fragmentary perspective view with parts broken away and showing structural details of the gas nozzles and the control means therefor;

FIGURE 7 is a fragmentary schematic view showing one set of inboard gas nozzles adjusted for vertical or hovering flight condition;

FIGURE 8 is a view corresponding to FIGURE 7 and showing one of the outer sets of nozzle elements adjusted for vertical movement of the aircraft; and FIGURE 9 is a fragmentary sectional view of a subassembly of the operating mechanism employed to adjust the position of the gas nozzles.

Referring more particularly to FIGURES 1, 2 and 3, there is shown a preferred embodiment of the invention aircraft designated generally 10 having a main elongated fuselage 11 and a pair of aerodynamically-contoured wings 12, 12 projecting laterally from the outer remote sides of structure 13, 13 supporting the venturi slots 25, 25. When on the ground the craft may be supported in any suitable manner, as by skids 14 or by wheels, the skids being quite adequate, simpler and presenting less air losses in flight.

The air slot structures 13 are attached to the opposite ends of the fuselage by means of suitable framing covered with aerodynamically-contoured fairing 16 and 17. This framing includes rigid tubular structural members 19 and 20 (FIGURE 5) extending lengthwise of the craft and rigidly secured to the framing members. The central tubular member 20 on each side of the frame is in communication at its forward end with the hot gas distributing ducts 21, 21 supplied from the discharge end of the forward hot gas generator 22. The inboard and outboard hollow members 19, 19 are in communication at their rear ends with the hot gas distributing ducts 23, 23 supplied by rear gas generator 24. Normally, the aircraft is powered by gas supplied by both gas generators, their combined outputs being distributed to all six of the tubular gas distributors 19, 20. However, if one generator becomes inoperative for any reason, the output of the latter is adequate to meet flight requirements though with a smaller safety margin, it being noted that either generator is effective to supply hot gas to all slots 25 and that the generators, whether operating alone or together, are always effective to maintain the balance and stability of the aircraft.

Referring more particularly to FIGURES 5 and 6, it is pointed out that the air slot supporting structures 13, 13 extend throughout the major length of the fuselage and each is provided with a pair, or more, of vertically disposed slots 25, 25 lying generally parallel to one another along the sides of the fuselage and contoured to form venturi passages capable of handling mass flow quantities of air. This air enters from the top side of structures 13 and exits from their lower sides. One of the inboard slots 25 is shown in cross-section in FIGURE 5 and is formed in part by a high strength tubular member 19 and in part by tubular member 20. A hollow member similar to 19 extends along the outboard side of the outer venturi slots, whereas member 20 serves the adjacent sides of both venturi slots. Both of members 19, 20 are flattened and have the general cross-sectional contours shown, their midportions being interconnected by high strength tie members 27.

The right-hand side of member 19 is provided with a downwardly directed nozzle passage 28 extending the full length of the venturi slot and opening into the upper interior portion of member 19. The inner and outer side walls of passage 28 are formed by smooth-surfaced fairing members 29, 30, each being suitably anchored to member 19 and to the fuselage of the aircraft. Of importance is the fact that these fairing members are contoured to form one longitudinal side of the slot-like venturi passage 25. The opposite side of the inboard venturi slot likewise has a downwardly directed nozzle passage 32 extending the full length of the outboard side of the inner venturi passage 25 and is formed by the laterally spaced-apart overlapping edges of the upright U-shaped fairing 33 and the inverted U-shaped fairing 34. The upper edge of fairing 33 is overturned about the upper edge 35 of a member 36 secured to tubular member 20, as by the reinforcing links 37. A similar member 36' is rigidly supported in member 19 by tie links 37'. The outwardly facing sides of members 36 and 36' are channeled to support operating links 38, 38' pivotally and operatively connected to the gas flow directing vane 39, 39'.

The gas directing vanes serve highly important functions and are of generally S-configuration when viewed from their transverse sides. A cylindrical portion 41 is journaled at the bottom of slots 42 (FIGURE 6) opening downwardly from the upper edge 35 of member 36. The lower ends of members 39 are journaled loosely in openings formed in operating strips 38 and their upper ends are of inverted U-shape with their free ends 43 extending loosely downwardly through the gas passage 32. These lower ends 43 may be appropriately called vanes and cooperate with the adjacent portions of fairing members 33, 34 in forming downwardly directed nozzle passages 45 through which the hot pressurized gas issues in high velocity jets (FIGURE 6).

From the foregoing it will be apparent that the direction of the gas flow from the lower ends of nozzle passages 45 is dependent upon the adjusted positions of members 39, 39' and particularly of their vanes 43, 43'. This is controlled simultaneously and in unison by lengthwise adjustment of the operating bar 38, 33'.

THE CONTROL SYSTEM

The aircraft control system is illustrated diagrammatically in FIGURE 4 and utilizes a pair of rigid tubular members 50, 50 extending crosswise of the fuselage and supported in suitable journals mounted therein. The forward tube 50 is enclosed within fairing member 16 whereas the rear tubular member is enclosed within fairing member 17. Welded to the midportions of each tube is a bell crank 51, 51'. Rotatably supported at the end of its horizontal arm is a pinion shaft 52 carrying pinions 53 at its outer ends. These pinions mesh with teeth 54 on the end of the horizontal arm of bell cranks 56, 56 rotatably supported on tube 50. Secured to each pinion is a pulley 57 seating an endless cord belt 58 trained over pulleys 59 supported on a shaft mounted internally of tube 50. Belt 58 then passes lengthwise through the tube to its outer end and one run has multiple turns circling a drum 60.

Referring to FIGURE 9, it will be understood that spool 60 is fixed to the outer end of shaft 61 mounted in bearings carried by a housing 62 having trunnions 63, 64 journaled in arms 65 welded to tube 50. Enclosed within housing 62 is a miter gear 67 mating with a second miter gear 68 having a hollow threaded stem 69 mating with the threads of a rod 70 detachably connected at one end to a rigid cross member 71. It will be understood that each of the pinions 53, 53′ is similarly connected through endless belting to power transmitting links 70 connected, as will be explained presently, to various groups of the adjustable nozzle members 39, 39′.

Welded to the midportions of tube 50 are arms 75 connected to links 76 and connector bars 77 connected at their outer ends to the nozzle operating members 38, 38′. The latter operating bars extend the full length of the inboard nozzle 25 and serve to adjust all nozzle vanes along both sides of the inboard venturi slots.

The pilot controls include a collective control stick 80 and a differential control stick 81, the collective stick serving to make major adjustments and the differential stick serving to make fine, minor and differential adjustments and to control pitch and roll movements, and the collective stick operating to adjust all nozzles in unison. The differential stick also includes operating connections to the ailerons 103 and to the rudder elements 101, 101 hinged along the rear edges of stabilizer fins 102 (FIGURES 1, 4).

Control stick 80 is journaled for rotary movement lengthwise of the fuselage and drives a sector gear 83 meshing with teeth carried by a push-pull rod 84 having its forward end connected to the vertical arm of bell crank 51 and its rear end connected to the vertical leg of bell crank 51′.

The operating connections and structure of control stick 81 is somewhat more complex, the lower end of the stick being rigidly connected to the midportion of cross bar 86 of an H-shaped member having parallel legs 87, 88. Cross piece 86 is journaled in the stem of a hollow T-shaped member 90 having a slotted head 91. Journaled on the outer end of head portion 91 are a pair of bell cranks 92 the horizontal legs of which are loosely pivoted on the outer ends of member 87. A rod member 94 slidably supported in tubular head 91 has a U-shaped center portion 95 formed with a ring loosely encircling stick 81 and is suitably operatively connected to ailerons 103. A second set of bell cranks 96 are also loosely journaled on the T-head 91 and have their horizontal legs projecting rearwardly and loosely pivoted to the outer ends of rod member 88.

The vertical legs of bell cranks 96 are coupled through push-pull rods 97′ with well known servo actuators 98′, 98′ suitably anchored to the fuselage and having output rods coupled to the lower ends of bell cranks 56′. Likewise, the upper ends of the other pair of bell cranks 92 are coupled through push-pull rods 97 with servo actuators 98, 98 having their output push-pull rods coupled to the lower ends of bell cranks 56.

It will be understood that differential control stick 81 has limited universal freedom of movement in any direction from the neutral position illustrated in FIGURE 4. Thus, it can be moved fore and aft longitudinally of the plane, to the right or left laterally of the plane, and in any direction intermediate these two major planes of movement. Fore and aft movement serves to control pitch movement of the plane whereas strict lateral movement controls roll. Movement in any intermediate direction serves to provide combined pitch and roll movement of the craft.

In addition to the foregoing, the controls include a foot-operated rudder control 99 supported for pivotal movement about a vertical axis and located immediately forward of the pilot's feet. As is best shown in FIGURE 1, rudder control 99 is also connected through cabling 104 and other suitable connections with gas flow control valves 105, 105′, and 106, 106′ located at the diagonally disposed corners of the aircraft in the manner indicated in FIGURE 1. It will be understood that these valves are located in conduits in communication with the pressurized gas supply system and are normally closed. These valves control flow to ports opening laterally outwardly through the fore and aft portions of the craft and assist yaw movements of the craft about its yaw axis. Only the valves for a selected diagonally disposed set of corners can be opened at any given time, it being understood that the control connections include suitable lost motion connections well known to those skilled in this art to avoid having more than one diagonally disposed set of valves open simultaneously.

A second pair of rigid arms 75′ are rigidly secured to the forward tubular member 50 near its outer ends and include push-pull connections 76′ to operating connector bars 76″. The latter connector bars are operatively interconnected to the lower ends of a central group of nozzle vanes B, B distributed along the midportion of the outer pair of venturi passages 25, 25. Another group of nozzle vanes A, A, located at the forward ends of these same venturi slots, are connected through operating links 70, 71 with gear box 62 which, as described above, are actuated by endless belts 58. A third and rear group of nozzle vanes C, located at the rear end of the outer venturi slots, are similarly connected through operating links 71′ and gear boxes 62′ with the rear set of actuating belts 58′.

Nozzle vanes 39, 39′ on either side of each inner venturi slot 25 are actuated by a common operating bar 38, 38′ connected through links 76, 77 and arm 75 fixed to the forward tubular member 50. As is best shown in FIGURE 7, it is pointed out that all vanes on each side of the venturi slot are so connected to bars 38, 38′ that when the control sticks are in their neutral positions the vanes and the nozzle ports therebetween are preferably inclined and as shown. Thus, as is diagrammatically illustrated in FIGURE 7, the nozzle passages at the forward end of the craft are inclined downwardly and forwardly, those centrally of the venturi slot are vertical, while those at the rear end of the slot are inclined downwardly and rearwardly. The inclination of the nozzles is relatively slight and roughly of the order indicated in FIGURE 7.

FIGURE 8 illustrates diagrammatically the corresponding neutral positions of the three groups A, B, C nozzle vanes along either side of the two outer venturi slots 25, 25. Groups A and C converge downwardly, whereas central Group B extends vertically as do the corresponding nozzle vanes of the two inner venturi slots. Group A vanes are interconnected by a common operating bar 71, Group B by a common bar 76′ and Group C by a common bar 71′.

OPERATION

In operation, gas generators 22, 24 are started in conventional manner, atmospheric air entering through intakes 110 (FIGURE 2) following which it is compressed as by turbo compressors, not shown, and then mixed with fuel and burned to produce high pressure hot gas. This pressurized hot gas is distributed through ducts 21, 23 into the three tubular frame members 19, 20 extending along either side of the fuselage. The gas so distributed to tubular members 19, 20 has a temperature of at least 1000 degrees F. and a very substantial pressure. Desirably, the power output of the gas generators is regulatable through fuel flow connections to the rotatable handgrips 80', 80' on collective control stick 80. This enables the pilot to regulate the power output over a wide range while grasping and operating the collective control proper.

When the pilot is ready for take-off, he places all three controls 80, 81 and 99 in neutral position. Under these conditions the vanes 39, 39' defining nozzle passages 45 along either side of venturi passages 25 are positioned as shown in FIGURES 4, 7 and 8. While the vanes are so positioned, the pilot manipulates control 80' to increase the fuel supply to the two gas generators when ready for take-off. The large quantity of pressurized gas so generated maintains a plentiful supply of gas in the distributing ducts with the result that very high velocity jets of hot gas discharge downwardly through the nozzle jets 45, as is indicated by arrows 111 in FIGURES 5 and 6. This high velocity flow of gas along either side of venturi passages 25 downstream from its throat area entrains a mass flow of air downwardly through all venturi slots.

This mass flow of the ambient air is produced by the combined effect of a large number of factors. These include the frictional drag and entraining effect on the airstream by the high velocity hot gas issuing from nozzles 45. In addition, the closely spaced jets of hot gas along the sides of the diverging outlet ends of the venturi slots impinge on the underlying body of ambient air, compressing it to provide a high pressure body of air below the venturi slots. This relatively high pressure body of air cooperates with the low pressure body of air overlying the venturi slots to produce powerful lifting action on the entire craft. Another highly important factor is the transfer of heat into the ambient airstream flowing through the slots thereby greatly augmenting the mass flow of air therethrough and the pressure differential between the air above and below the venturi slots. These and related factors all contribute in producing a highly effective and efficient mass flow of air downwardly past both sides of the fuselage to produce lifting effect on the aircraft. This lifting effect greatly supplements the lifting force during take-off and landing produced by the reaction forces of the gas streams issuing from nozzles 45. These reaction forces act generally vertically on the main frame of the aircraft and principally on the tubular members 19, 20.

As the aircraft rises clear of the ground and of the surrouding terrain features, the pilot may transition into level flight by forward movement of collective stick 80. This operation operates to pivot all of the nozzle blade units forwardly from their neutral positions thereby shifting the resultant of the reactive forces forwardly from the vertical. In so doing, the nozzle orifices or passages are inclined to the vertical and rearwardly along either side of the throats in the venturi slots. In consequence, the mass air flow now occurs downwardly and rearwardly at an angle increasing with forward movement of stick 80 and effective to propel the plane forwardly to produce air flow over the wing surfaces 12, 12. This relative wind passing over the airfoils then contributes a major share of the aerodynamic lift and supplements the operation of the venturi slots in supporting the craft.

Roll and pitch movements of the craft are accomplished primarily by manipulation of differential control stick 81, forward movement longitudinally of the aircraft resulting in downward pitch and backward movement causing the craft to pitch upwardly. Lateral movement to the right or to the left causes the ship to roll about its longitudinal axis and in the direction of movement of stick 81.

Right or left turns are accomplished by movement of differential control stick 81 in the direction in which the pilot wishes to turn. Assuming the pilot wishes to make a descending righ turn, he moves stick 81 forward and to the right thereby rotating the H-shaped unit 86, 87, 88 forward while simultaneously tilting its right corner downwardly and its opposite diagonal corner upwardly. At the same time, the pilot pushes rudder control 99 with his right foot thereby opening yaw control valves 106, 106' in the left front and rear front corners of the craft and causing the plane to turn to the right about its vertical or yaw axis. The forward and rightward movement of control stick 81 serves to increase the forward inclination of the Group A vanes at the forward right corner of the outer venturi passage and decreases the inclination of the Group C vanes located at the left rear of the aircraft. Simultaneously the right rear Group C and the left hand Group A vanes remain essentially unchanged. This differential control action results in lowering of the right forward corner and upward tilting of the opposite side of the plane thereby facilitating and expediting the right turn for reasons well understood by those skilled in the control and flight of aircraft.

In normal level flight it will be understood that the nose is tilted slightly downwardly with the underside of the wing inclined upwardly at a slight angle representing the angle of attack. Under these conditions, the mass air flow occurring through slots 25 is sharply inclined downwardly and rearwardly through the slot.

When the pilot is ready to land, he pulls rearwardly on collective control 80 with the result that the gas jets issuing from nozzle passages 45 are now directed essentially downwardly. The plane therefore gradually slows and is again supported substantially entirely by the reaction forces produced by the downwardly flowing gas streams and by the mass air flow occurring through venturi slots 25. As hovering regime is approached, the pilot increases the fuel flow to the engines to generate a greater quantity of higher pressure hot air and then regulates this fuel supply as necessary for the hot gas to support the craft while settling to the ground. During this operation, the pilot may wish to move forwardly to counteract wind forces and to bring his craft into alignment with the landing area. This is accomplished by the appropriate forward or rearward movement of the collective or differential sticks. As the plane settles onto the ground, the operator throttles the fuel supply or cuts it off entirely.

In further explanation of the manner in which the Group A and Group C vanes cooperate in controlling the flight mode and changes therein, it will be understood that when the vanes are positioned as shown in FIGURE 8 the principal thrust force from all vanes is upward and that the slight lateral thrust components produced by the oppositely inclined Groups A and C act in opposite directions and therefore cancel one another. After take-off and as the plane is rising, forward thrust of control stick 81 inclines the Group A vanes further forwardly while simultaneously tilting the Group C vanes toward a vertical position. This causes the plane to pitch downwardly since the Group A vanes produce less vertical thrust while the Group C vanes are more effective in producing upward thrust on the aft end of the aircraft. Contrariwise, backward movement of control stick 81 tilts the Group A vanes toward a vertical position while inclining the Group C vanes more acutely rearward causing the plane to pitch upwardly and forwardly.

If control stick 81 is moved to the right, for example, then the Group A and Group C vanes on the left-hand side are both inclined toward the vertical position, whereas the corresponding Group A and C vanes on the right-hand side are inclined more acutely to a downwardly converging pattern thereby providing less effective upward thrust on that side and causing the plane to roll about its longitudinal axis. Roll in the opposite direction is accomplished by shifting control stick 81 to the left.

While the particular V/STOL aircraft herein shown and disclosed in detail is fully capable of attaining the objects and providing the advantages hereinbefore stated, it is to be understood that it is merely illustrative of the presently preferred embodiments of the invention and that no limitations are intended to the details of

I claim:

1. An aircraft having a fuselage supporting hot pressurized gas generating means, means including airfoil means secured to said fuselage cooperating therewith to provide airborne support for said aircraft and utilizing hot pressurized gas from said gas generating means to produce a mass flow of air thereover, said means having elongated slot-like venturi passages accommodating generally planar flow streams therethrough, means providing streams of hot pressurized gas discharging into said venturi passages at their respective throats and along the sides of said throats thereby to induce mass air flow through said venturi passages from the upper side of said aircraft and discharging into the ambient air beneath said aircraft, and means for varying the direction of flow of at least portions of said mass air flow to vary the direction of the net effective thrust acting on said aircraft and including means for varying the angle of discharge of hot pressurized gas into the throats of said venturi passages to vary the direction of the reaction forces resulting from the jetting of said hot gas into the venturi passages.

2. An aircraft as defined in claim 1 characterized in that said means for introducing hot pressurized gas into the throats of said venturi passages and downstream therealong is effective to decrease the ambient air pressure overlying said passages while simultaneously increasing the ambient air pressure below the throat areas of said passages thereby to produce a thrust force acting in a direction counter to the direction of gas flow through said venturi passages.

3. An aircraft as defined in claim 1 characterized in that said means for the airborne support of said aircraft includes elongated slot-like venturi passage means having an upwardly opening air inlet and a downwardly opening mixed air and warm gas outlet, and means located along the throat portion of said venturi passage means and closely spaced laterally of the flow of air through said throat to introduce hot pressurized gas in the general direction of air flow through said venturi passage thereby to produce thrust forces on said aircraft.

4. An aircraft as defined in claim 2 characterized in that said airfoil means extends laterally from the opposite sides of said fuselage and along axes that extend crosswise of said fuselage and of said elongated slot-like venturi passages.

5. An aircraft as defined in claim 2 characterized in that said airfoil means have leading and trailing edges located between the opposite ends of said elongated slot-like venturi passage means.

6. An aircraft having a fuselage, means carried thereby for generating hot pressurized gas, means for utilizing said gas to propel, hover and maneuver said aircraft and including a plurality of slot-like venturi passages having their flow axes arranged in upright planes with their outlet ends discharging downwardly and disposed generally parallel to one another along each side of said fuselage, airfoil means extending crosswise of said aircraft between the opposite ends of said fuselage and supplementing said venturi passages in supporting said aircraft in flight, the opposite interior side walls of said venturi passages having means forming downwardly directed gas jetting passages at least some of which are adjustable to vary the direction of gas flow therealong, and means for conveying hot pressurized gas to said gas jetting passages from said gas generating means.

7. An aircraft having an elongated fuselage provided with hot pressurized gas generating means, means supporting a plurality of upright flattened tubular venturi structures along either side of said fuselage having upwardly opening inlets and downwardly directed outlets, the throats of said venturi structures lying in a generally horizontal plane and being generally rectangular in cross section with their longer dimension extending lengthwise of said fuselage, rows of downwardly directed gas discharge nozzles along the opposite longer sides of said throats, means for conveying pressurized gas from said gas generator to said nozzles to create upwardly acting reaction forces on said aircraft to supplement the lifting action thereon generated by the downward mass flow of air created through said venturi structures by the hot gas issuing from said nozzles, flight control means for controlling the flight path of said aircraft from a control station thereon and including means for selectively and differentially adjusting the positions of said gas nozzles thereby to cause said aircraft to roll and to pitch as desired.

8. An aircraft as defined in claim 7 characterized in the provision of control means regulatable at said control station and utilizing hot pressurized gas from said gas generating means to cause yaw movements of said aircraft selectively to the right and to the left.

9. An aircraft as defined in claim 7 characterized in that said gas generating means includes a plurality of gas generators, and means for supplying pressurized gas from each of said generators to the gas jetting means along at least one side of each of said venturi structures whereby pressurized gas can be supplied thereto in the event of power failure of another of said gas generators to maintain the aircraft in aerodynamically stabilized flight condition with gas supplied from the remaining operating gas generator.

10. An aircraft as defined in claim 7 characterized in that said venturi structures include means providing aerodynamically contoured surfaces between the adjacent inlets and the adjacent outlets of the venturi structures.

11. An aircraft as defined in claim 10 characterized in that the interior of said venturi structures is hollow and constitutes duct means and part of the means for conveying pressurized gas from said gas generators to said gas discharge nozzles.

12. An aircraft as defined in claim 7 characterized in that said gas discharge nozzles are formed in part by closely spaced separator members arranged in a row in a close sliding fit between a pair of walls, means movably supporting said separator members for relative tilting movement parallel to said walls and including means for tilting said members in unison.

13. An aircraft as defined in claim 12 characterized in that said separator members are arranged in separate groups and in the provision of separate means operable to tilt the members in each group independently of the members in another of said groups.

14. A VTOL aircraft having a main body provided with elongated vertically disposed slots extending lengthwise thereof and providing a flow passage of substantially constant cross-sectional area under all operating conditions of the aircraft, said slots being of venturi shape transversely thereof and for substantially the full length of said slots in the transverse plane thereof and being substantially free of obstructions, means for generating pressurized gas and for discharging the same downwardly through said slots to induce air flow downwardly therethrough, said downward air flow and the reaction of pressurized gas flow cooperating to produce upward thrust on said main body adequate to lift the same from the ground, and means to vary the direction of induced air flow and of said pressurized gas downwardly through said slots to vary the direction of effective thrust on said aircraft.

15. A VTOL aircraft as defined in claim 14 characterized in that each of said slots is provided with at least one row of pressurized gas jets extending lengthwise thereof and including means operatively connected thereto for tilting the same in a plane extending lengthwise of said slots.

16. A VTOL aircraft having an elongated main body housing a pressurized gas generating device, rigid duct means projecting laterally from said main body at spaced points lengthwise thereof, means extending between said duct means and forming at least one vertically disposed long and relatively narrow air flow slot along the opposite sides of said main body of venturi shape transversely of said slots, a plurality of gas jets opening downwardly through the throats of said venturi-shaped slots including means for adjusting the direction of gas discharge therefrom thereby to vary the direction of air flow and the direction of effective thrust imparted to said aircraft by pressurized gas and air discharging from the lower end of said air slots and controllable gas discharge nozzles discharging laterally from the forward and rearward outer periphery of said aircraft and effective to produce yaw selectively to the right and to the left at the will of the pilot.

17. In combination with a VTOL aircraft, said aircraft having means providing an elongated narrow air flow slot opening vertically through said aircraft and of venturi shape crosswise thereof, said slot having a throat provided with a downwardly directed row of gas discharge jets along either side thereof, said jets including means for tilting the same in a plane generally parallel to a plane extending vertically through the longitudinal axis of said slots thereby to vary the direction of reactive thrust imparted to said aircraft by gas and air flowing through said slot.

18. The combination defined in claim 6 characterized in the provision of independently operable means for adjusting the angle of groups of said gas discharging jets located in different areas lengthwise of said elongated slots.

19. The combination defined in claim 18 characterized in that said groups of independent gas jets include groups located at the opposite ends of said long slot whereby the effective upward thrust at the opposite ends of said slot can be varied to vary the pitch angle of said slot relative to a horizontal plane to facilitate transfer between vertical and forward modes of flight of said aircraft.

20. A heavier-than-air aircraft having a fuselage housing pressurized hot gas generating means, rows of closely spaced hot gas jetting nozzles wherein adjacent nozzles are separated from one another by adjustable vanes movable to adjust the axis of the gas jet issuing therefrom, and means including a pair of manually manipulatable controls selectively operable to control the positions of different groups of said gas nozzles collectively and differentially at the pilot's option.

21. An aircraft as defined in claim 20 characterized in the provision of foot-operated control means including connections to valve means for jetting pressurized gas laterally from a selected pair of diagonally arranged nozzle means in the fore and aft ends of said aircraft to produce yaw movements thereof.

22. A V/STOL aircraft having downwardly discharging venturi passage means rigidly secured thereto, said venturi passage means having a generally rectangular throat, downwardly opening slot means extending along either longer side of said throat, and means for discharging hot pressurized gas through said slots and at different angles to a plane extending transversely of said throat and effective to entrain a mass flow of ambient air downwardly through said venturi passage.

23. An aircraft as defined in claim 22 characterized in that said means for discharging gas through said slot means includes groups of movable vanes, and operating means connected to each group of vanes for adjusting said vanes relative to the vanes in the other groups.

24. An aircraft as defined in claim 23 characterized in the provision of separate manual controls operatively connected to said groups of vanes and one of which manual controls is operable to move all of said groups in unison.

25. An aircraft as defined in claim 24 characterized in that the other of said manual controls is operable to move selected ones of said groups independently of other of said groups.

26. An aircraft as defined in claim 25 characterized in the provision of rudder means and of aileron means on said aircraft operatively connected to the other of said manual controls and operable thereby to vary the flight path of said aircraft irrespective of whether hot gas is being discharged through said slot means.

27. A VTOL aircraft having venturi slot passage means disposed generally vertically along the opposite sides thereof with the inlets thereof facing upwardly, rows of gas discharging jets discharging downwardly in the throats of said venturi passage means and adjustable in groups to vary the flow path of the gas discharging from said jets into the outlet ends of said venturi passage means, control means interconnecting all of said groups of jets and operable selectively to incline the groups at one end of said venturi passage means differently from the inclination of the groups of jets at the other end of said passage means to cause the aircraft to pitch in a desired direction, and said control means being movable crosswise of said aircraft to position the groups of jets along one side of the aircraft generally vertically to increase the upward thrust on that side and for simultaneously moving the remotely spaced groups of jets on the other side to converge downwardly thereby decreasing the upward thrust on that side and causing the plane to roll about its longitudinal axis.

28. A VTOL aircraft having venturi slot passage means disposed generally vertically along the opposite sides thereof with the inlets thereof facing upwardly, rows of gas discharging jets discharging downwardly in the throats of said venturi passage means and adjustable in groups to vary the flow path of the gas discharging from said jets into the outlet ends of said venturi passage means, control means interconnecting all of said groups of jets and operable to incline the groups of vanes at the opposite ends of said venturi passage means differentially and in opposite directions to cause the aircraft to pitch and to roll in a direction and degree dependent on the extent of movement of said control means.

References Cited

UNITED STATES PATENTS

| 3,066,891 | 12/1962 | Seagen | 244—23 |
| 3,148,848 | 9/1964 | Price | 244—23 |
| 2,936,969 | 5/1960 | Griffith et al. | 244—55 X |

FOREIGN PATENTS 1,199,711 6/1959 France.
1,267,920 6/1961 France.

FERGUS S. MIDDLETON, *Primary Examiner.*

MILTON BUCHLER, *Examiner.*

B. BELKIN, *Assistant Examiner.*